B. SMITH.
Making Buttereine.
No. 148,767.
Patented March 17, 1874.
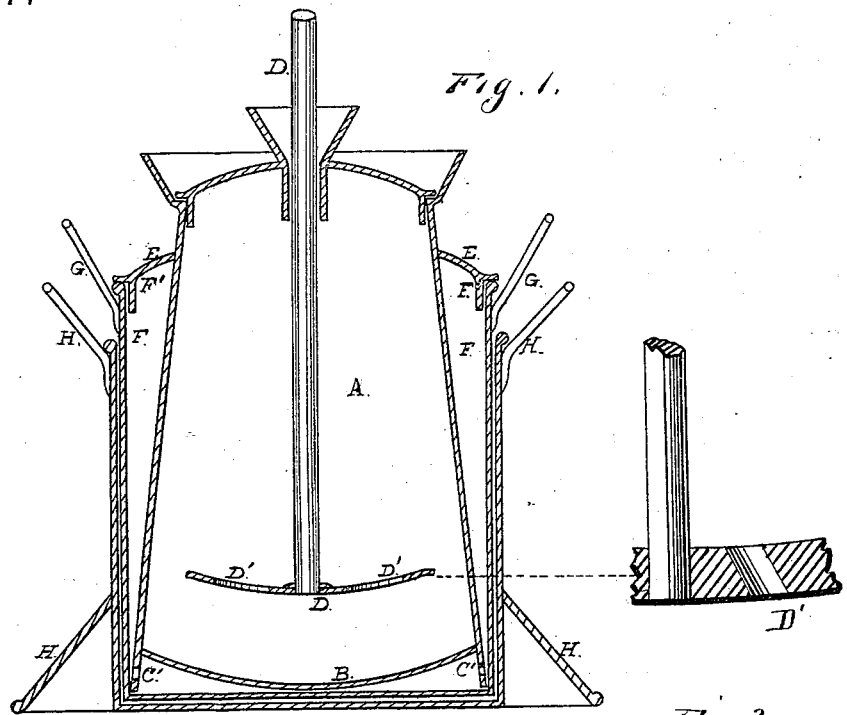
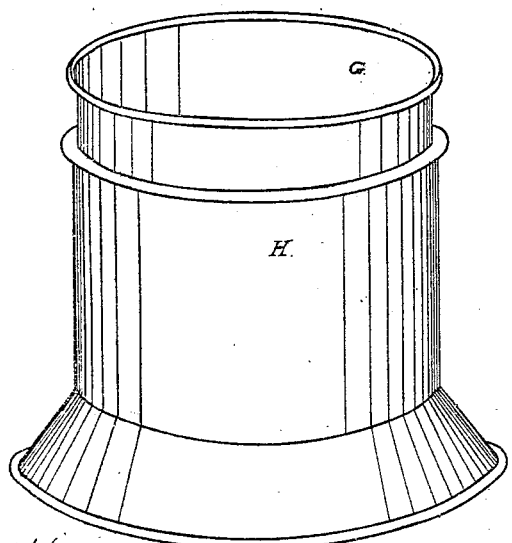
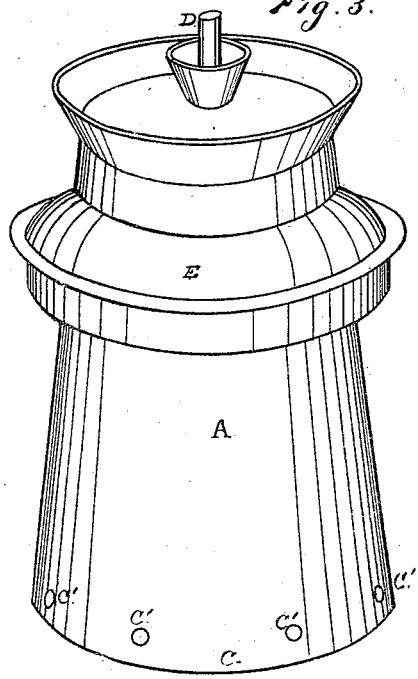
Witnesses
A. G. Anthony
A. Bakes
Inventor
Budd Smith
By his attorney
C. Wm. Smith

UNITED STATES PATENT OFFICE.

BUDD SMITH, OF SAN FRANCISCO, CALIFORNIA.

IMPROVEMENT IN MAKING BUTTERINE.

Specification forming part of Letters Patent No. 148,767, dated March 17, 1874; application filed February 28, 1874.

*To all whom it may concern:*

Be it known that I, BUDD SMITH, of San Francisco, in the county of San Francisco and State of California, have invented an Improved Process for Producing a New Article of Food from Milk, of which the following is a specification:

This invention is a process for producing from milk a new article of food, the same being a compound formed of curd or cheese and butter, and which may be used as a substitute for either; and it consists in subjecting the milk, in connection with a base of prepared butter, to certain chemical action and mechanical agitation, by means of which the curd is precipitated, and the oily globules burst and gathered to form butter.

In connection with the process, certain essential apparatus is employed, which, in connection with the foregoing, will be fully described hereinafter. A general statement of my invention may be made as follows:

A suitable quantity of a base of butter, prepared as will be hereinafter described in detail, is properly placed within a churn of peculiar construction with the yelks of eggs. To this a suitable quantity of fresh milk is added, and, by proper instrumentalities, the mass of milk and butter is subjected to galvanic action, and also thoroughly agitated. By this means a compound is formed resembling fresh butter in appearance and taste, which is composed of the curd or cheese formed from the caseine of the milk and butter gathered from its oily globules.

The details of the invention will now be described, with the best method known to me of practicing the same.

The butter employed as the base is prepared in the following manner: Take, first, an earthenware cylinder or bottomless dish, and provide it with a zinc bottom, and also with a similar cover, which latter should be perforated to allow the escape of steam or gas. The zinc plates forming the bottom and cover are first prepared by coating them with saltpeter, which operation may be performed by placing a proper quantity of the substance in a tea-kettle, and directing upon them a steam-jet from the spout. When thus prepared, place in the dish a proper quantity of good sweet butter, packing the same loosely, or with a space at the bottom. Then place the dish in a flat-bottomed kettle or pan containing a solution of salt in water, blood-warm in temperature, in sufficient quantity to make the depth about a quarter of an inch when the kettle is in place. A steam-jet from a kettle-spout, or some suitable boiler, should then be applied to the outside of the dish at one point of its circumference, and an air-blast from a bellows, or other air-blowing mechanism, at the same time at an opposite point, the dish being at the same time revolved; this operation being continued until, by means of the application of heat and air and the galvanic action arising from the zinc and saltpeter, a certain oil is extracted, which would otherwise interfere with the successful practice of my invention. In treating a pound of butter, about one ounce is extracted, and about five minutes are required to perform the operation. The residuum of this process constitutes the base, which I employ in connection with the milk. In connection with this base of prepared butter, I employ the yelks of eggs, for the purpose of obtaining a settling action in the milk, and a consequent accumulation of the butter in a mass, when the churning process is being performed. When one pound of butter is used, two eggs will be the proper proportion. The yelks of these should be carefully removed from the white portions, and be well beaten in a half tea-spoonful of salt, which is employed for the purpose of cutting them thoroughly. Then strain through a linen cloth with lukewarm water, in equal parts by measure, or in sufficient quantity to cause the yolks to strain readily, so that all stringy substances may be removed. Then mix the egg-yelk with the base of prepared butter; or first apply the butter to the interior of the churn, and then afterward apply the eggs. This base is then placed in the churn, which will now be described.

Its main body portion is made of ordinary tin, but its bottom is composed of a concave zinc plate, as shown in Fig. 1. It is made tapering in form, inclining inward from the bottom upward, and its lower edge forms a perforated flange, C', as shown in Fig. 1. It is provided near its neck with a flange or rim, E, having a lip, F, extending downward, so that a chamber, F', is formed around the churn to retain the steam and heat from the water in the heater G; and it has, also, suitable cover and a proper convex dasher, D, having spiral or inclined openings D', as shown. This base of prepared butter is placed in this churn, mainly at the bottom, but the side also may be coated by rubbing with the hand. The churn, when thus prepared, is allowed to stand thirty minutes to permit the butter and egg to become thoroughly incorporated.

In the meantime, or previous to coating the churn, the heater G is prepared as follows: This heater consists of a cylindrical vessel made entirely of zinc. Previous to using it it is coated with saltpeter, in a manner similar to that before described; then take a little more than a fluid gallon of water, in which has been placed a table-spoonful of saltpeter, and reduce the same by boiling to a gallon; then pour the same into the heater G, add a tea-spoonful of salt, and stir the whole well. When the temperature of this water is about 110° Fahrenheit, the milk (one gallon of which should be used with one pound of butter) may be poured into the churn, which already contains the prepared butter and egg-yelk, and the churn then be placed in the heater containing the hot solution of saltpeter. The dasher of the churn should then be immediately operated, in the usual well-known manner, and continued in operation for about the space of sixty seconds, more or less, according to the indications, after which the churn should be removed and set into the cooler H, which consists simply of a cylindrical vessel made of zinc and coated, as before described, and contains cold water having a spoonful of salt to the gallon. The dasher being still operated for about the space of thirty seconds, the churn may be removed, when it will be found that the milk has entirely disappeared, and a compound has been produced, resembling, in appearance and taste, fresh butter, which may be formed and molded in glass molds.

That portion of the compound which is formed from the milk consists mainly of curd or cheese and butter. After the compound has once been made, a portion of it may be employed, if desired, to form the base for a new batch.

If the operation is properly performed, as before described, the results will be as set forth, the theory of the operation being, it is believed, as follows: The galvanic action arising from the saltpeter battery decomposes a portion of the caseine, and, consequently, lactic acid is formed from the sugar of milk, by means of which the curd is precipitated, the mechanical agitation at the same time bursting the oily globules, and uniting the compound in one homogeneous mass.

It will be understood that, while this is a compound composed of several elements—butter, cheese, and egg-yelk—it is in no sense an adulteration, all the elements being pure and healthful. It is evident that it can be produced at a small cost, and that it can be used as a substitute for butter.

It should be understood that in producing this invention much depends upon immediate action when the right temperature of the liquid is obtained in the heater.

It will be understood that this substance does not resemble fresh butter so closely as to deceive persons accustomed to examine the same—a marked difference, in fact, upon inspection, distinguishing the one from the other.

Having thus fully described my invention, what I claim as new, and desire to secure by Letters Patent, is—

1. The process described for preparing the butter employed as a base, consisting essentially in the application of heat and air, in cooperation with galvanic action, substantially as described.

2. The process of producing from milk the compound described, consisting essentially in subjecting the milk, in combination with the compound base, to galvanic action and mechanical agitation, substantially as described.

3. Butterine made of a base of yelk of egg and butter, and of milk, in about the proportions and substantially as described.

In witness whereof I have hereunto set my hand and seal.

BUDD SMITH. [L. S.]

Witnesses:
C. W. M. SMITH,
W. SPANGLE.